United States Patent [19]

Goodier et al.

[11] Patent Number: 5,355,275
[45] Date of Patent: Oct. 11, 1994

[54] CURRENT LIMITING DEVICE FOR ELECTROMAGNETIC COIL EMPLOYING GAP CONTAINING SUPERCONDUCTIVE SHIELD

[75] Inventors: Philip J. Goodier, Manchester; Peter J. Davidson, Chester, both of England

[73] Assignee: Imperial Chemical Industries PLC, London, England

[21] Appl. No.: 809,908

[22] Filed: Dec. 20, 1991

[30] Foreign Application Priority Data

Dec. 21, 1990 [GB] United Kingdom ............... 9027803

[51] Int. Cl.⁵ .............................................. H03K 17/92
[52] U.S. Cl. ..................... 361/141; 307/306; 323/360; 336/DIG. 1; 361/19; 361/58
[58] Field of Search ............ 307/306, 245, 462; 323/360; 336/DIG. 1, 178, 134; 361/19, 58, 141; 335/216; 338/325; 505/1

[56] References Cited

U.S. PATENT DOCUMENTS

| | | | |
|---|---|---|---|
| 3,091,702 | 5/1963 | Slade | 307/245 |
| 4,942,378 | 7/1990 | Barber | 335/216 |
| 5,023,230 | 6/1991 | Cheng | 505/1 |
| 5,250,508 | 10/1993 | Pham | 505/1 |

FOREIGN PATENT DOCUMENTS

| | | |
|---|---|---|
| 0311331 | 4/1989 | European Pat. Off. . |
| 0348104 | 12/1989 | European Pat. Off. . |
| 0353449 | 2/1990 | European Pat. Off. . |
| 6462089 | 3/1989 | Japan . |
| 1157227 | 6/1989 | Japan . |
| 1206831 | 8/1989 | Japan . |
| 9002407 | 3/1990 | PCT Int'l Appl. . |

OTHER PUBLICATIONS

Patent Abstracts of Japan, vol. 13, No. 421 (E-822)(3769) Sep. 19, 1989 & JP-A-1157227 (Matsushita Elec. Works).
Patent Abstracts of Japan, vol. 13, No. 513 (E-847)(3861) Nov. 16, 1989 & JP-A-1206831 (Mitsubishi Cable Ind).
Patent Abstracts of Japan, vol. 13, No. 271 (P-889) Jun. 22, 1989 & JP-A-1062809 (Furukawa Elec. Co.).

*Primary Examiner*—A. D. Pellinen
*Assistant Examiner*—Richard T. Elms
*Attorney, Agent, or Firm*—Cushman, Darby & Cushman

[57] ABSTRACT

A variable impedance device comprises a coil (10) and an associated magnetic circuit (16) having a gap receiving a plate (20) of superconducting material which acts as a shield or barrier so that, while the plate (20) is in its superconducting state, magnetic flux is caused to traverse the gap via pathways substantially greater in length than the width of the gap. If a large current is passed through the coil (10), the plate (20) becomes resistive thereby presenting a substantially increased impedance to the current. The device may be used in current limiting applications, or other applications where a variable impedance is required.

13 Claims, 4 Drawing Sheets

CURRENT LIMITING DEVICE FOR ELECTROMAGNETIC COIL EMPLOYING GAP CONTAINING SUPERCONDUCTIVE SHIELD

BACKGROUND OF THE INVENTION

1. Field of the Invention

This invention relates to electromagnetic devices and, in particular, variable impedance devices, e.g. current limiting devices such as are used in power supply systems in order to control the current supplied from a source to a load. Such devices are particularly useful in limiting the current which flows under fault conditions.

2. Description of Related Art

European Patent Application No. 353449 discloses a current limiting device comprising a coil and an associated core of magnetically soft material such as iron forming a closed magnetic circuit, the coil being wound on a hollow cylinder of superconducting material which encircles the core and influences flux linkage between the coil and the core in dependence upon the magnitude of the current supplied to the coil.

Whilst such an arrangement presents a relatively low impedance to currents of normal magnitude and is effective in limiting current flow through the coil in response to the occurrence of large magnitude fault currents, it suffers from the drawback that the dimensions of the cylinder are determined by the dimensions of the coil which means that the larger the coil the larger the cylinder must be. The cylinder has to be cooled to a suitable temperature in order to secure the superconducting properties of the material and consequently the larger the cylinder the greater its surface area and the greater the cooling power necessary to maintain the cylinder at a desired temperature. In addition, fabrication of large diameter cylinders from superconducting materials is not a trivial matter.

SUMMARY OF THE INVENTION

According to a first aspect of the present invention there is provided a current limiting device comprising a coil and an associated magnetic circuit, characterized in that the magnetic circuit is interrupted by at least one gap containing a body or bodies of superconductive material so dimensioned that, in response to flow of relatively small magnitude currents through the coil, the magnetic flux induced in the magnetic circuit is caused to traverse the gap(s), without penetrating said body or bodies to any significant extent, via paths substantially greater than the width of the gap whereas, in the event of flow of relatively large magnitude currents through the coil, the magnetic flux traverses the gap(s) by penetration through said body or bodies.

In accordance with a second aspect of the invention there is provided a current limiting device comprising a coil and an associated magnetic circuit, characterized in that the magnetic circuit is interrupted by at least one gap containing a body or bodies of superconductive material, said body or bodies in the superconducting state thereof forming a magnetic flux shield or shields extending laterally outwardly beyond the magnetic circuit in the vicinity of the gap(s) whereby magnetic flux can only traverse the gap(s) via circuitous pathways skirting around said body or bodies.

In this manner, the impedance presented to the current flow through the coil is dependent upon the magnitude of the current supplied. Where the current supplied is within a predetermined range, the flux cannot traverse the gap, at least not to any significant extent, by direct penetration through said body when the body is in its superconducting state and therefore has to follow an extended pathway around the body and through the surrounding lower permeability medium, usually air, which in turn results in the coil presenting a relatively low inductive impedance to the current flowing through it. On the other hand, when the current supplied is of sufficiently large magnitude, the superconducting properties of the body are modified to such an extent that the flux in the magnetic circuit can penetrate through the body and directly traverse the gap thereby presenting a large inductive impedance to the current supplied to the coil.

In contrast to the device disclosed in European Patent Application No 353449, the dimensions of the or each body of superconductive material employed in accordance with the present invention is dictated primarily by the cross-sectional dimension of the magnetic circuit in the vicinity of the gap and may be wholly independent of the dimensions of the coil, especially the length dimension of the latter. The mass of superconductive material employed for a coil and magnetic circuit of given dimensions may therefore be considerably less than that required in the device disclosed in European Patent Application No 353449. Moreover, since the or each body of superconductive material may be in the form of a plate, sheet or like generally planar component, fabrication may be simplified. However, we do not exclude the possibility that the or each body may have a tubular configuration with one end closed, i.e. so that the tubular portion encircles the magnetic circuit in the vicinity of the gap while the end wall is received within the gap.

The device may be used to limit current in single phase supply systems or in polyphase supply systems. In the latter event, there may be a separate device associated with each phase or, alternatively, the device may comprise more than one coil, each coil being associated with a different phase, and a common core providing magnetic circuit means, the magnetic circuit means including a gap associated with each coil and one or more bodies of superconducting material being provided in said gaps to act as shields or barriers to magnetic flux so that, if a fault current develops in any one or more of the phases, the impedance of the associated coil increases substantially to limit the current.

In use, the device will be provided with means for cooling the body to a temperature at which it is fully superconducting and preferably the superconductive material is one which possesses superconducting properties at temperatures attainable using cryogenic liquids such as liquid nitrogen, oxygen or helium as the cooling medium. Preferably the superconductive material is one which has a critical temperature not less than 77° K.

The invention can be practiced using a wide range of superconductive materials, e.g. a ceramic material of the oxide type such as those disclosed in our European Patent Application No 348104 and may be produced by the method disclosed and claimed in the latter European Application. Thus, for example, the body used in the device of the present invention may be composed of superconductive material comprising at least one element of the lanthanide series, scandium and/or yttrium, at least one alkaline earth element, and at least one transition element. A particularly preferred composition is $YBa_2Cu_3O_x$ where x is between 6.5 and 7.2.

Each body may consist substantially wholly of superconducting material but, provided that the necessary shielding/barrier properties are achieved, we do not exclude the possibility of each body being fabricated as a composite comprising the superconducting material and another non-superconducting component or components such as a polymer or polymers and/or a metal or metals. For instance, each body may comprise a sintered mass of superconducting material with the voids thereof impregnated with polymer. Alternatively, each body may comprise a matrix of polymer material or metal with particulate superconducting material dispersed throughout the matrix.

Although the present invention is particularly useful in fault current limiting applications, it is not limited to this particular application. Thus, according to a further aspect of the invention there is provided a device having a magnetic circuit which is interrupted by at least one gap containing a body or bodies of superconductive material, said body or bodies in the superconducting state thereof forming a magnetic flux shield or shields extending laterally outwardly beyond the magnetic circuit in the vicinity of the gap(s) whereby magnetic flux can only traverse the gap(s) via meandering pathways skirting around said body or bodies.

Such a device may be current dependent, as in the aspects of the invention previously-defined, or it may be temperature-dependent or dependant on an applied magnetic field. For example, if a coil is coupled with the magnetic circuit, the impedance of the coil may vary in dependence upon the temperature or magnetic field to which the body of superconducting material is subjected. For example, magnetic flux may be induced in the magnetic circuit, e.g. by means of a separate coil, so as to vary the flux shielding or barrier properties of the body of superconducting material, thereby varying the impedance of the first-mentioned coil. In this way, the impedance of the device may be switched between low and high values by means of an applied magnetic field. The fact that the superconducting properties of the body are temperature dependent affords the possibility of the device being used as a temperature sensor.

According to yet another aspect of the invention there is provided a device comprising a coil and an associated magnetic circuit, characterized in that the magnetic circuit is interrupted by at least one gap containing a body or bodies of material switchable, in dependence upon the magnitude of the current supplied to the coil, between a first state in which the or each body is substantially impenetrable by magnetic flux induced in the circuit by current flow through the coil, and a second state in which the or each body is penetrated by said magnetic flux.

Preferably the thickness of the or each body of superconductive material is substantially the same as the width of the gap or a respective gap, as considered in the direction of extension of the magnetic circuit.

Advantageously the device according to any one of the above aspects of the invention includes an element or elements composed of a magnetically soft material disposed adjacent the or each gap in offset relation to the magnetic circuit to provide a well-defined pathway for magnetic flux traversing the gap when said body is in a state in which it is substantially impenetrable to magnetic flux in the magnetic circuit. The provision of such magnetically soft element or elements serves to provide a sharper transition between the impedance presented by the coil in the flux impenetrable and flux penetrable states of the body as the current supplied to the coil is varied.

In one embodiment of the invention, the body is in the form of a plate or like planar component the entire periphery of which is located radially outwardly of the periphery of the magnetic circuit in the vicinity of the gap. In this embodiment, the magnetically soft element may comprise an annulus (not necessarily of circular configuration) encircling the body.

Where the magnetic circuit has more than one gap therein, the superconductive material contained within the gap may be provided by the same body or separate bodies. In the former instance, the body may be oriented so that different sections thereof are received in two or more gaps in the magnetic circuit.

Each body may itself be fabricated from a number of components, each comprising said superconducting material, and assembled together to form a flux shield or barrier.

BRIEF DESCRIPTION OF THE DRAWINGS

The invention will now be described by way of example only with reference to the accompanying drawings, in which.

DETAILED DESCRIPTION OF THE EMBODIMENTS

Figure 1:
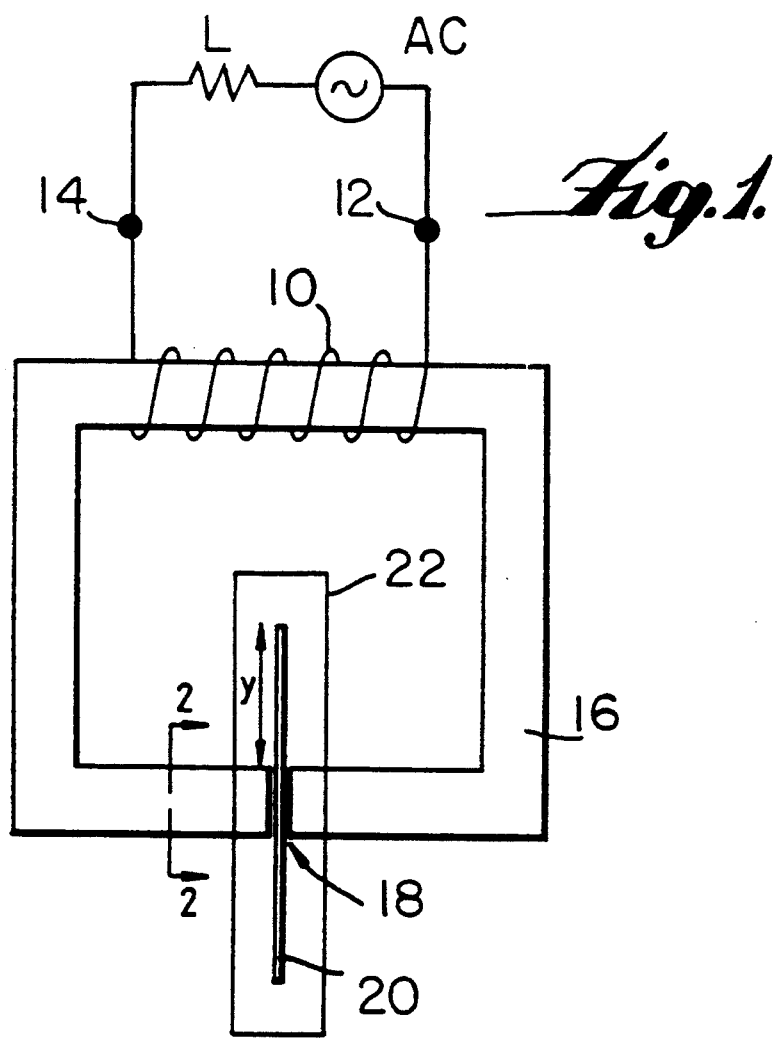
FIG. 1 is a schematic view of a current limiting device in accordance with the invention.
Figure 2:
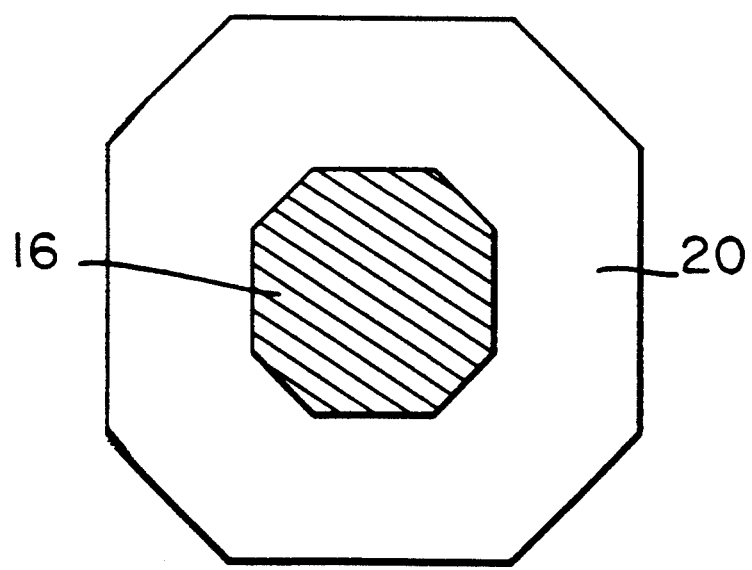
FIG. 2 is a view in the direction 2—2 in FIG. 1.

Referring to FIGS. 1 and 2, the current limiting device comprises an AC winding 10 having terminals 12 and 14 for connection one to an AC power source AC and the other to a load. The AC winding 10 is wound on an iron core 16 which may be fabricated from a large number of laminations in conventional fashion. The magnetic circuit formed by the core 16 is interrupted by an air gap 18 which in accordance with the invention contains a body 20 of superconductive material. The body 20 is in the form of a plate and, as seen in FIG. 2, it has a peripheral contour which generally follows that of the core cross-section but is of substantially larger dimensions.

The body 20 is enclosed in a vessel 22 supplied with coolant in order to maintain the body 20 at a temperature below the critical temperature of the superconductive material of which it is composed. Although the invention is not limited to any particular type of superconductor, the material is desirably one which has a critical temperature which will allow the use of a coolant other than liquid helium, e.g. liquid nitrogen.

Figure 3:
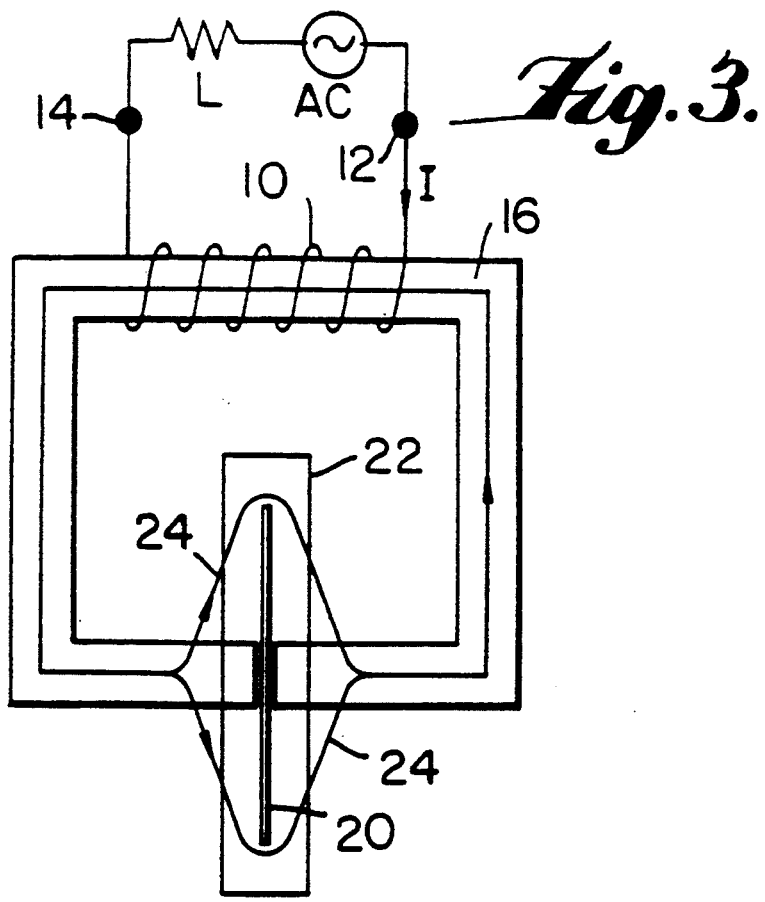
FIG. 3 is a similar view to that of FIG. 1 showing the flux paths produced in circumstances where the current flow through the coil is within the desired limits.

In normal operation of the device, the current flowing through the coil 10 results in the generation of magnetic flux in the magnetic circuit provided by the core 16 and the flux so generated induces a current flow within the body 20 which will not affect the superconducting state of the body. As a consequence, the body 20 when in its superconducting state functions as a shield to the magnetic flux in the core thereby forcing the flux to traverse the gap via circuitrous pathways such as that depicted by reference numeral 24 in FIG. 3. In this condition, therefore the coil 10 presents a relatively small impedance to the current.

Figure 4:
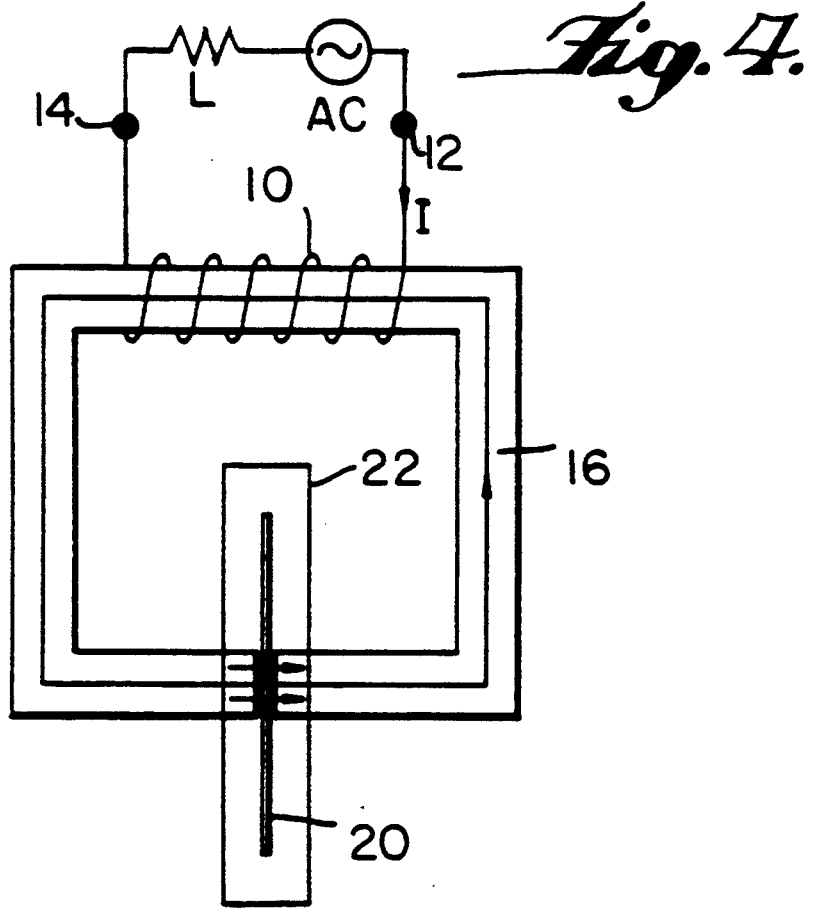
FIG. 4 is a similar view to that of FIG. 1 showing the flux paths produced in circumstances where a large magnitude fault current is applied to the coil.

If however, a fault current of sufficiently large magnitude is applied to the coil 10, the current density induced in the body 20 will exceed a critical current density such that the material becomes resistive and dissipates the induced current. In this state, the shielding properties of the body 20 break down thereby allowing the flux to traverse the gap via the body 20 as shown in FIG. 4. In such circumstances, the coil 10 presents a large impedance to the fault current and hence limits the fault current.

Figure 6:
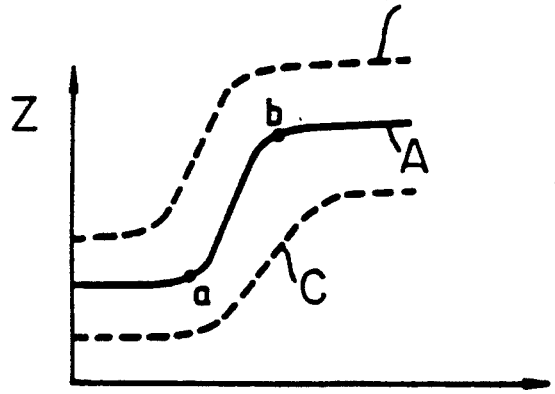
FIG. 6 is a view similar to that of FIG. 1 showing a modification.

FIG. 6 shows the form of relationship that is desirable between coil impedance and the source current, i.e. for currents within the rating of the load, the coil impedance should be low whereas high coil impedance is required for large magnitude currents, i.e. fault currents. Desirably, there should be a relatively sharp transition as indicated by the section of the curve A between points a and b. In the case of the embodiment shown in FIG. 1, the transition tends to be less sharp and it is thought that this is attributable to the fact that the flux, when following pathways such as that depicted in FIG. 3, tends to concentrate in the vicinity of the outer periphery of the body 20 and produce localized breakdown of the shielding as the applied current rises.

Figure 5:
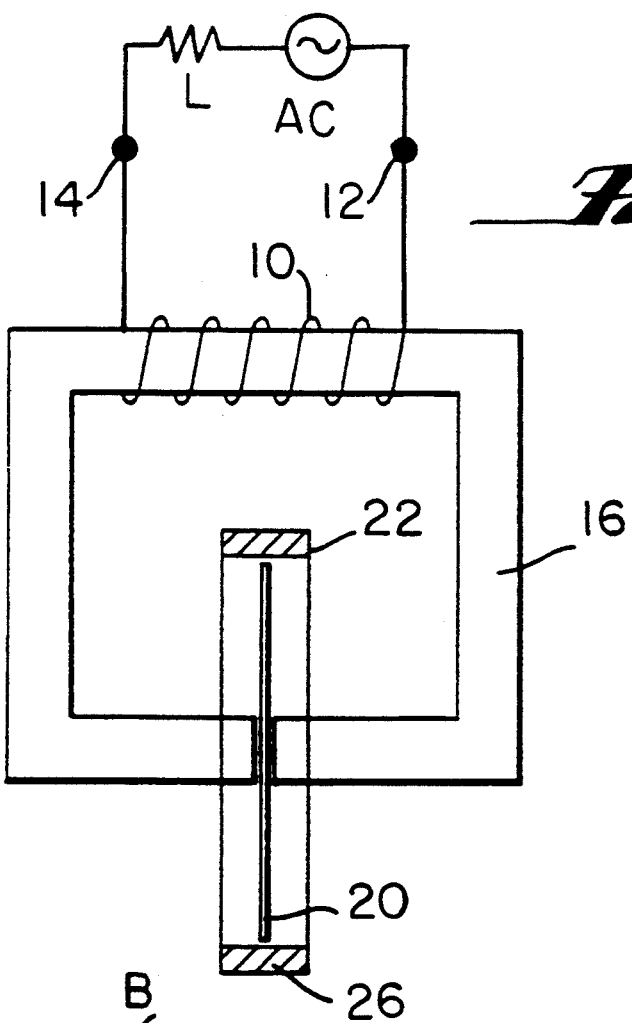
FIG. 5 is a graph indicating the variation of coil impedance Z with the current applied to the coil I.

We have found that the sharpness of the transition can be improved by providing magnetically soft material in the vicinity of the outer periphery of the body 20. Thus, as shown in FIG. 5, this may be achieved by a ring 26 or iron so that it encompasses the periphery of the body 20 and provides a well-defined pathway for the flux in this region.

The impedance-v-current curve may also be varied according to requirements by selection of the number of turns in the coil winding. Curve B shows qualitatively the effect of increasing the number of turns while curve C shows the effect of reducing the number of turns. The form of the curve is also influenced by variation in the width of the gap 18 and the extent to which the body 20 projects beyond the core (see dimension y in FIG. 1) and these latter parameters may be used to determine the impedances presented by the coil at normal and fault current levels.

In the schematic drawings, for clarity the air gap 18 is shown as being wider than the thickness of the body 20; however, in practice, the thickness of the body 20 will preferably be substantially the same as the width of the air gap. Also, we do not exclude the possibility that the body 20 may be composed in part of superconductive material; for example, the body 20 may comprise a substrate of non-superconductive material carrying a layer or coating of superconductive material sufficiently thick to enable the intended function of the body as a magnetic flux shield to be achieved.

Figure 7:
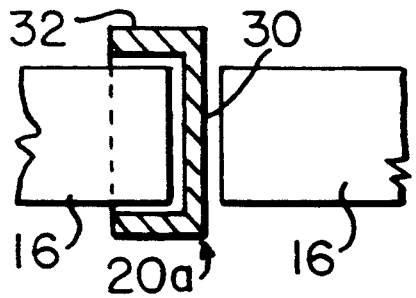
FIGS. 7, 8 and 9 are diagrammatic views showing further modifications.
Figure 8:
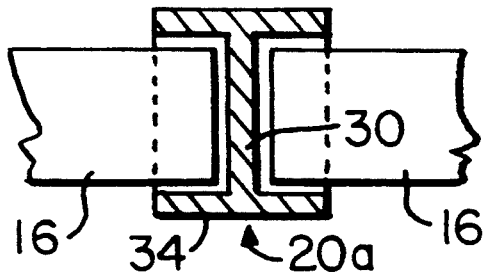

In the embodiments described above, the shielding effect is obtained by arranging for the body 20 to project radially outwardly to a substantial extent beyond the outer periphery of the core. FIGS. 7 and 8 show other possibilities that may be adopted in order to increase the magnetic flux path for normal levels of current supply. Thus, the body 20a in FIG. 7 is formed with an end wall 30 received within the gap and an axially extending peripheral wall 32 which encompasses the core adjacent one side of the gap. In FIG. 8, the body includes a wall portion 30 disposed within the gap and a peripheral wall 34 which encompasses the core adjacent both sides of the gap. In both cases, it will be seen that the body 20a in its superconducting state forces the flux in the magnetic circuit to follow a more circuitous route than the direct route which is available when the shielding effect of the body breaks down in response to large magnitude fault currents.

Figure 9:
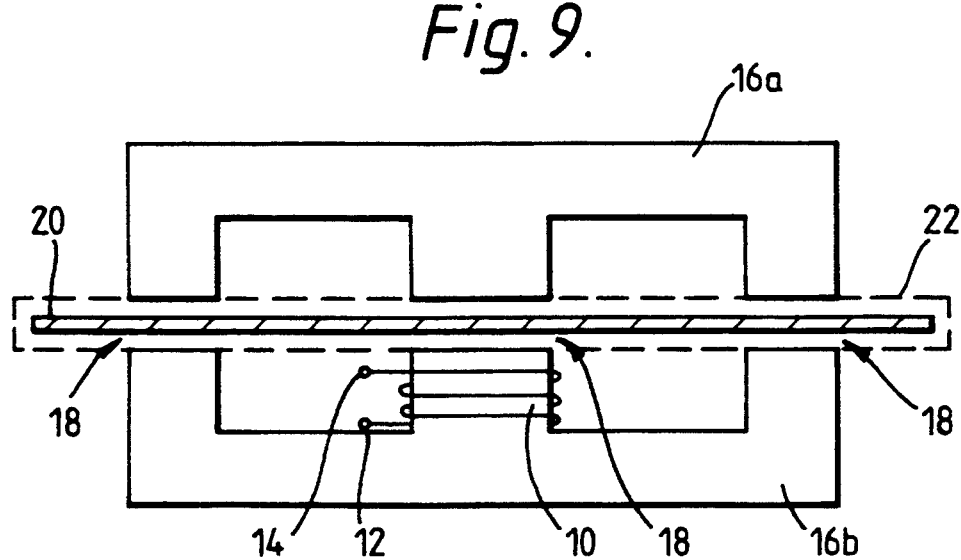

FIG. 9 illustrates an embodiment in which the magnetic circuit is interrupted by more than one gap. In this embodiment, the magnetic circuit comprises two E cores 16a, 16b arranged with gaps 18 therebetween, the current conducting coil 10 being wound around the central limb of the lower core 16b. A plate or sheet 20 of superconductive material is disposed so that different sections thereof are received in the gaps and the superconductive material is cooled by means of a vessel 22 supplied with liquid nitrogen. As in the embodiments previously described, the superconductive material acts as a magnetic flux shield while the material is in its superconducting state thereby producing a low impedance, but breaks down as a shield when the magnitude of the current increases to the point where the material becomes resistive thereby allowing flux to traverse the gaps by penetration through the superconductive material and substantially increasing the impedance presented by the coil 10.

We claim:

1. An AC electrical power supply having a power supply line interconnecting an AC electrical power source and a load, and a current limiting device interposed in the power supply line for limiting the magnitude of current that can be supplied to the load, said device comprising:

a magnetic circuit interrupted by a gap;

a coil which is wound around part of the magnetic circuit and is coupled to said power supply line so that current supplied from the AC electrical power source to the load passes through the coil and induces magnetic flux within the magnetic circuit; and superconducting means, inserted into the gap, for causing magnetic flux to traverse the gap via pathways greater than the width of the gap when current passing through the coil is within a predetermined range, said superconducting means including a body of superconductive material inserted into the gap so as to extend laterally beyond the magnetic circuit in the vicinity of the gap, and said superconducting means being rendered non-superconducting when the current through the coil exceeds said predetermined range so that flux induced in said magnetic circuit can traverse the gap by penetration through said body with consequent increase in impedance of the device.

2. A device as claimed in claim 1 in which the body of superconductive material is of planar configuration.

3. A device as claimed in claim 2 in which the body of superconductive material has a thickness substantially the same as the width of said gap, as considered in the direction of extension of the magnetic circuit.

4. A device as claimed in claim 1 in which the magnetic circuit has more than one gap therein, and in which the superconductive material contained within the gap is provided by the same body.

5. A device as claimed in claim 1, further comprising means for cooling the body of superconductive material to a temperature at which the superconducting material is substantially superconducting.

6. A device as claimed in claim 1 in which the body of superconductive material comprises a sintered mass of superconductive material.

7. A device as claimed in claim 1 in which the body of superconductive material comprises a composite material including as one component thereof said superconducting material.

8. A device as claimed in claim 7 which the composite material includes at least one material selected from the group comprising a polymer and a non-superconducting metal.

9. A device as claimed in claim 1 which further comprises an element composed of a magnetically soft material disposed adjacent the gap in offset relation to the magnetic circuit to provide a well-defined pathway for magnetic flux traversing the gap when said body of superconductive material is in a state in which it is substantially impenetrable to magnetic flux in the magnetic circuit.

10. A device as claimed in claim 9 in which said element comprises an annulus encircling the body.

11. A device having a magnetic circuit which is interrupted by a gap, and a magnetic flux controlling means comprising:

a superconductive element inserted into said gap and forming in the superconducting state thereof a magnetic flux shield extending laterally outwardly beyond the magnetic circuit in the vicinity of said gap so that magnetic flux can only traverse the gap via paths which are greater than the width of the gap; and a magnetically soft element disposed adjacent the gap in offset relation to the magnetic circuit to provide a well-defined pathway for magnetic flux traversing said gap when the superconductive element is in its superconducting state.

12. A device as claimed in claim 11 in which the magnetically soft element comprises an annulus encircling said superconductive element.

13. A device as claimed in claim 1 or claim 11, wherein said body comprises an end wall disposed in said gap, and a peripheral wall encompassing a portion of said magnetic circuit.

* * * * *